United States Patent
Graf

(10) Patent No.: US 8,468,804 B2
(45) Date of Patent: Jun. 25, 2013

(54) EXHAUST LINE FOR AN INTERNAL-COMBUSTION ENGINE HAVING A SHUT-OFF VALVE WITH A DIAGNOSTIC CAPABILITY

(75) Inventor: Hubert Graf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 607 days.

(21) Appl. No.: 12/249,369

(22) Filed: Oct. 10, 2008

(65) Prior Publication Data
US 2009/0094970 A1    Apr. 16, 2009

(30) Foreign Application Priority Data
Oct. 13, 2007    (DE) .......................... 10 2007 049 171

(51) Int. Cl.
*F01N 3/00* (2006.01)
*F01N 5/04* (2006.01)
*F01N 3/10* (2006.01)
*F01N 1/00* (2006.01)
*E03B 7/07* (2006.01)
*F16K 37/00* (2006.01)
*F17D 3/00* (2006.01)

(52) U.S. Cl.
USPC .................. 60/287; 60/280; 60/288; 60/299; 60/324; 137/557

(58) Field of Classification Search
USPC .................. 60/277, 280, 287, 288, 292, 299, 60/324; 137/312, 557
See application file for complete search history.

(56) References Cited

U.S. PATENT DOCUMENTS

| | | | |
|---|---|---|---|
| 3,344,807 A * | 10/1967 | Lehrer et al. | 137/557 |
| 3,835,878 A * | 9/1974 | Braidt et al. | 137/246.13 |
| 5,522,219 A * | 6/1996 | Orzel et al. | 60/274 |
| 6,182,445 B1 | 2/2001 | Yamazaki et al. | |
| 6,321,533 B1 | 11/2001 | Watanabe et al. | |
| 2003/0011136 A1* | 1/2003 | Ramirez et al. | 277/500 |
| 2006/0059910 A1* | 3/2006 | Spaeder et al. | 60/612 |
| 2006/0283178 A1* | 12/2006 | Akagawa | 60/286 |
| 2007/0214775 A1* | 9/2007 | I et al. | 60/288 |

FOREIGN PATENT DOCUMENTS

| | | |
|---|---|---|
| DE | 2 262 727 | 6/1974 |
| DE | 25 32 838 A1 | 1/1977 |
| DE | 198 22 424 A1 | 7/1999 |
| DE | 199 57 306 A1 | 12/2000 |
| EP | 1 715 162 A2 | 10/2006 |
| EP | 1 835 140 A2 | 9/2007 |
| JP | 04017714 A * | 1/1992 |
| JP | 8-334014 A | 12/1996 |
| JP | 2004-132213 a | 4/2004 |

OTHER PUBLICATIONS

Hiromichi Yanagihara, English Abstract of JP 04-017714 A, Jan. 22, 1992.*
German Search Report dated Apr. 24, 2008 with English translation of the relevant portions (Nine (9) pages).

* cited by examiner

*Primary Examiner* — Kenneth Bomberg
*Assistant Examiner* — Audrey K Bradley
(74) *Attorney, Agent, or Firm* — Crowell & Moring LLP

(57) ABSTRACT

An exhaust line of an internal-combustion engine contains a catalyst and a bypass pipe bypassing the catalyst. The bypass pipe can be shut-off by way of a shut-off valve. The shut-off valve has a diagnostic device for diagnosing a tightness of the shut-off valve.

12 Claims, 2 Drawing Sheets

EXHAUST LINE FOR AN INTERNAL-COMBUSTION ENGINE HAVING A SHUT-OFF VALVE WITH A DIAGNOSTIC CAPABILITY

CROSS-REFERENCE TO RELATED APPLICATIONS

This application claims priority under 35 U.S.C. §119 to German Application No. 10 2007 049 171.0, filed Oct. 13, 2007, the entire disclosure of which is expressly incorporated by reference herein.

BACKGROUND AND SUMMARY OF THE INVENTION

The invention relates to an exhaust line for an internal-combustion engine, which exhaust line contains a catalyst and a bypass pipe bypassing the catalyst. The bypass pipe can be shut off by way of a shut-off valve having a diagnostic capability. The invention further relates to a shut-off valve with the diagnostic capability.

To provide an emission control that is as extensive as possible, it is desirable with respect to catalysts contained in an exhaust line of an internal-combustion engine that the diameter be small and the cell number be high. For reasons of power, particularly for not building up an exhaust back pressure that is too high, a large diameter and a low cell number are advantageous.

For at least partially resolving this conflict, exhaust lines, particularly those having several catalysts, are equipped with a bypass pipe bypassing at least one of the catalysts. Under defined operating conditions, this bypass pipe can be shut off by way of a shut-off valve so that, under these operating conditions, all exhaust gas flows through all catalysts, whereas, under other operating conditions, a portion of the exhaust gas flows through the bypass pipe and thereby bypasses the catalyst around which the flow takes place.

It is an object of the invention to further develop an exhaust line of the above-described type such that the shutting-off of the bypass pipe can be diagnosed; that is, it can be determined by way of a diagnosis whether all exhaust gas is in fact flowing through the exhaust line or the catalyst(s) present in the exhaust line.

According to the invention, an exhaust line for an internal-combustion engine contains a catalyst and a bypass pipe bypassing the catalyst, which bypass pipe can be shut off by way of a shut-off valve. The shut-off valve has a diagnostic device for diagnosing a tightness of the shut-off valve.

Advantageous further developments of the exhaust line according to the invention are described and claimed herein.

It is a further object of the invention to provide a shut-off valve which has a simple construction, is capable of reliably diagnosing its tightness, and can be used particularly for the exhaust line according to the invention.

From German Patent document DE OS 25 32 838, a shut-off valve is known by which it is to be prevented that media, mutually separated by the shut-off valve, mix with one another in conduits of pipes. This shut-off valve has two valve seats spaced in the flow direction of the medium flowing through them when the shut-off valve is open. The shut-off vale also contains a valve stem to which one valve disk is rigidly mounted and another valve disk is mounted so that it can be moved against the force of a spring. By operating the valve stem, the valve disks can simultaneously be caused to rest against the valve seats. The space between the valve seats can be flushed by use of a liquid fed from the outside and through a gap between the valve stem and the valve disk movably guided on the valve stem.

From German Patent document DE OS 2 262 727, a shut-off valve is known which can be used particularly for gas burning systems and contains two valve seats spaced in the flow direction of the medium flowing through them. Further, two mutually concentrically arranged valve bodies are provided, which can be displaced relative to one another and, in a closed position, each rest sealingly against one of the valve seats. A diagnostic space is formed between the valve seats or the valve bodies and is accessible from the exterior by way of a diagnostic pipe, this diagnostic pipe being the only access to the diagnostic space when valve bodies rest sealingly against the valve seats. By the action of vacuum on the diagnostic pipe, it can be determined whether the valve closes reliably in that, for example, in the case of a given output of a vacuum pump within a predetermined time period, a predetermined vacuum is reached or a reached predetermined vacuum decreases by less than a predetermined value within a defined time period.

According to the invention, a shut-off valve is provided in the case of which two valve bodies are rigidly connected with a valve stem and tolerances are compensated such that at least one of the valve seats, while having a sealing effect, is movably held on the housing of the shut-off valve.

Further advantageous embodiments of the shut-off valve according to the invention are described herein.

Other objects, advantages and novel features of the present invention will become apparent from the following detailed description of the invention when considered in conjunction with the accompanying drawings.

DETAILED DESCRIPTION OF THE DRAWINGS

Figure 1:
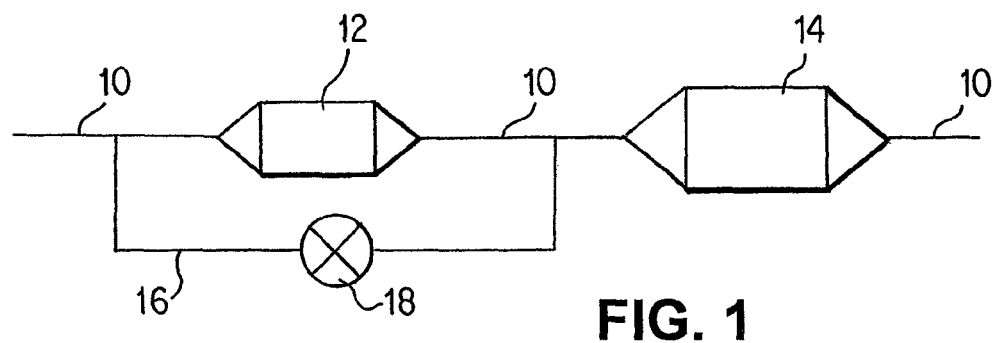
FIG. 1 is a view of a first embodiment of an exhaust line having a shut-off valve.

According to FIG. 1, an exhaust line of an internal-combustion engine has an exhaust pipe 10 in which a pre-catalyst 12 and a main catalyst 14 are arranged in series. A bypass pipe 16, in which a shut-off valve 18 is arranged, is provided parallel to the pre-catalyst 12.

For avoiding a high exhaust back pressure, for example, in the high-power range of the internal-combustion engine (not shown), at least a portion of the exhaust gases may flow around the pre-catalyst 12 as a result of opening the shut-off valve 18. However, under certain operating conditions, it is required that all exhaust gas flows through the pre-catalyst as well as through the main catalyst 14. In order to ensure the latter, the shut-off valve 18 must have a diagnostic capability; that is, it must be reliably determinable whether the shut-off valve 18 is tight.

Figure 2:
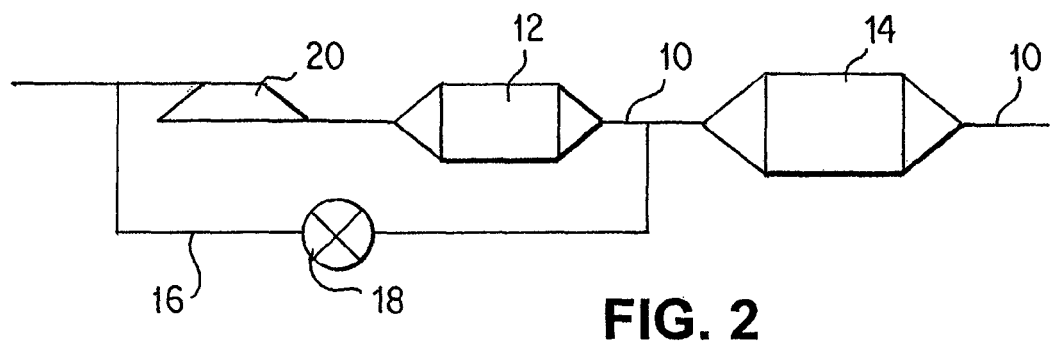
FIG. 2 is a view of a second embodiment of an exhaust line having a shut-off valve.

FIG. 2 illustrates an embodiment of an exhaust line which is modified in comparison to FIG. 1 and where the exhaust gas turbine 20 of an exhaust gas turbocharger is arranged in the exhaust pipe 10 upstream of the pre-catalyst 12. The bypass pipe 16 bypasses the exhaust gas turbine 20 as well as the pre-catalyst 12. In the case of the exhaust line according to FIG. 2, the shut-off valve 18 can take over the function of a bypass valve whose opening reduces a charging of the internal-combustion engine (not shown), under certain operating conditions, by way of the exhaust gas turbocharger connected with the exhaust gas turbine 20.

Figure 3:
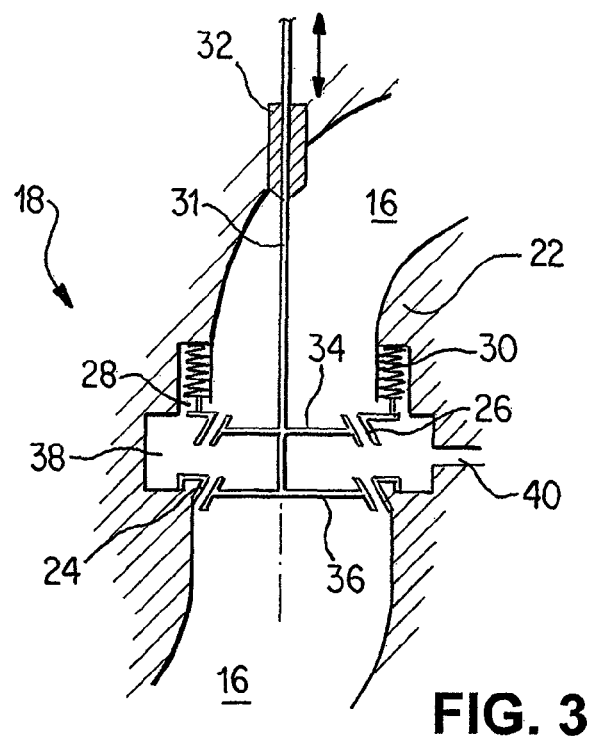
FIG. 3 is a diagrammatic view of a shut-off valve according to the invention.

FIG. 3 is a schematic view of the construction of a shut-off valve 18 having a diagnostic capability. A first ring-shaped valve seat 24 is rigidly constructed on a housing 22 only outlined by a broken line. The valve seat 24 may be constructed to be integral with the housing or may be formed by a separate component rigidly connected with the housing 22. Furthermore, a second ring-shaped valve seat 26, which is coaxial with the first valve seat 24, is axially movably held on the housing 22. The valve seats 24 and 26 are mutually spaced in the direction of the exhaust gas flowing through them, i.e., axially. The second valve seat 26 is rigidly constructed on a preferably cylindrical ring part 28, which is axially movable against the force of a spring 30 and sealingly with respect to the housing 22.

For operating the shut-off valve 18, a valve stem 31 is provided which can be moved, for example, by use of an actuator known per se in the direction of the double arrow and which is guided through the housing 22 in a manner sealed by a sealing device. Two valve bodies 34 and 36, constructed as a valve disk, are rigidly fastened to the valve stem 31 at a mutual distance, which corresponds approximately to the spacing of the valve seats.

As clearly illustrated in FIG. 3, the valve bodies 34 and 36 can be moved simultaneously into sealing contact onto the valve seats 24 and 26 as a result of the upward movement of the valve stem 31, in which case tolerances, wear, etc. are compensated by the displaceability of the ring part 28 against the force of the spring 30 or of the second valve seat 26 rigidly connected with this ring part 28.

As further illustrated in FIG. 3, when the shut-off valve 18 is closed, a diagnostic space 38 is constructed between the valve seats 24 and 26 or between the valve bodies 34 and 36 in the housing 22, which diagnostic space 38 is sealed off by the sealing contact between the valve bodies and the valve seat with respect to the bypass pipe 16 and a diagnostic pipe 40 leads away from the diagnostic space 38 into the exterior space. When the diagnostic pipe 40 is acted upon by a vacuum, this vacuum also occurs in the diagnostic space 38 when both valve bodies rest sealingly against the pertaining valve seats. Thus, the tightness of the shut-off valve 18 can be diagnosed in that the diagnostic pipe 40 is acted upon by a vacuum and, in the case of a given pumping capacity of a vacuum pump (not shown), a predefined vacuum occurs within a predefined time period or, after a predefined vacuum has been reached, this vacuum does not decrease faster than a predefined value within a predefined time period. The diagnosis of the tightness of the shut-off valve can also take place in a different manner in that, for example, a suction takes place in the diagnostic pipe 40 and the taken-in gas is analyzed with respect to its constituents which are also contained in the exhaust gas flowing through the pipe 10. As an alternative, the diagnostic space 38 can be acted upon by excess pressure by way of a pressure pump, and the tightness can be determined in that the variation in time of the excess pressure buildup and/or its peak value and/or, for example, after the shutting-off of the diagnostic pipe at the pump-side end, the drop of the excess pressure are diagnosed.

Figure 4:
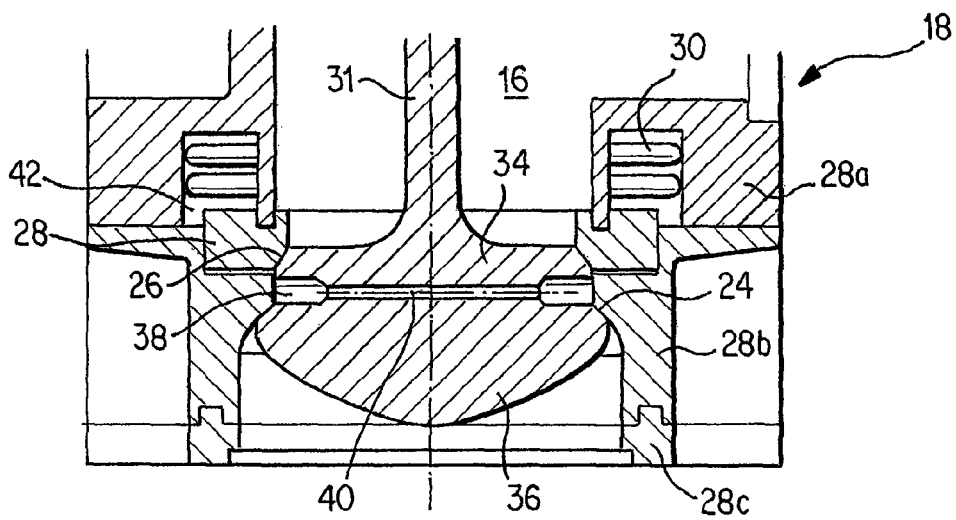
FIG. 4 is a partial view of an embodiment of a shut-off valve according to the invention.

FIG. 4 is a sectional view of a detail of a modified embodiment of a shut-off valve, the same reference numbers being used for components which functionally correspond to the components of FIG. 3.

The housing is constructed in three parts, having a top part 28a, a center part 28b and a bottom part 28c, which can be mutually connected, for example, by way of studs. The center part 28b is ring-shaped and is constructed with the first valve seat 24. The top part 28a has a ring groove 42 on whose radially interior wall the ring part 28 is guided, which is constructed with the second valve seat 26. The spring 30 is accommodated in the ring groove 42, which spring 30 is constructed as a corrugated bellows spring, so that, on one side, a seal is achieved between the ring part 28 and the housing top part 28a and, on the other side, the ring part 28 is prestressed by way of a force in the direction of the housing center part 28b. The ring part 28, the housing top part 28a, and the housing center part 28b are mutually coordinated such that the ring part 28 cannot only be moved axially against the force of the spring 30 but to a certain extent can also be moved radially, so that tolerances or misalignments between the valve body 34 and the valve seat 26 can be compensated.

In the illustrated embodiment, the valve bodies 34 and 36 are constructed in one piece with the stem 31 such that an annulus forming the diagnostic space 38 is formed between the areas resting against the valve seats 24 and 26. Optionally, at least one bore in the area of the annulus may lead centrally through the valve member 31, 34, 36. The diagnostic pipe 40 leads as a borehole away from the housing bottom part 28c in the area of the diagnostic space 38.

The operation of the shut-off valve according to FIG. 4 corresponds to that of FIG. 3.

Figure 5:
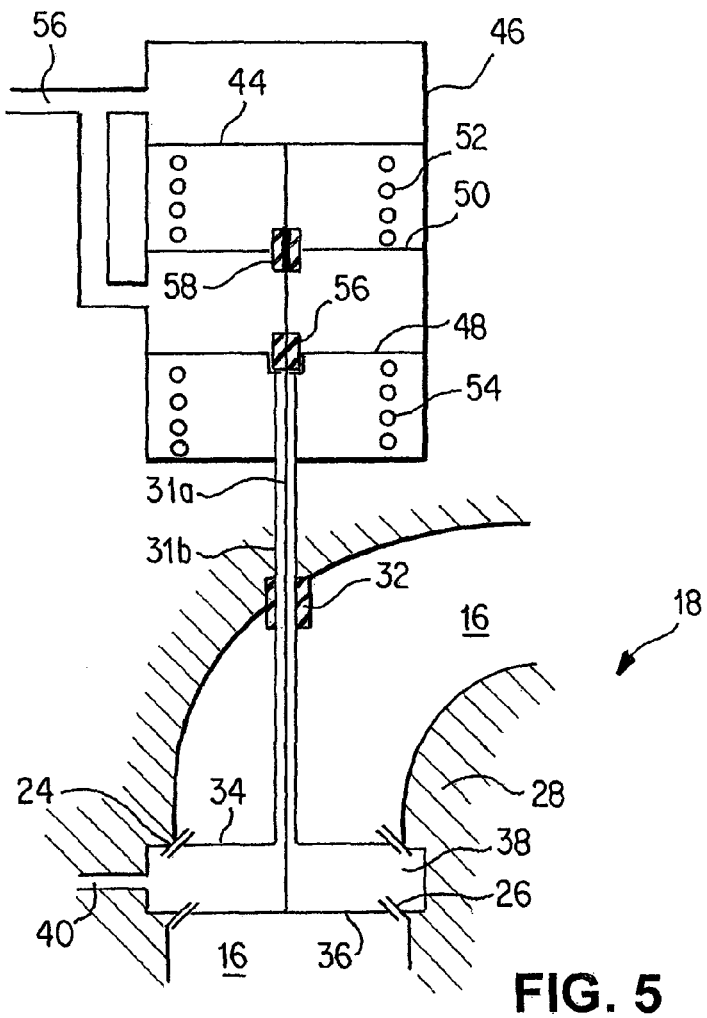
FIG. 5 is a diagrammatic view of another embodiment of a shut-off valve according to the invention with its operating device.

FIG. 5 shows an embodiment of a shut-off valve with a pertaining operating device, which is modified with respect to FIGS. 3 and 4. The same reference numbers as in FIGS. 3 and 4 are again used for functionally mutually corresponding components.

According to FIG. 5, the valve body 36 cooperating with the second valve seat 26 is rigidly connected with a stem 31a, which is rigidly connected with a piston 44 operating in a piston/cylinder unit 46. The valve body 34 is rigidly connected with a hollow stem 31b through which the valve stem 31a extends and which is rigidly connected with another piston 48 operating in the piston/cylinder unit 46. The housing of the piston/cylinder unit 46 has a separating wall 50 through which the interior valve stem 31a extends. A pressure spring 52 is arranged between the wall 50 and the piston 44.

Another pressure spring 54 is arranged between the piston 48 and a bottom wall of the housing of the piston/cylinder unit 46.

A pressure pipe 56 is connected to working chambers constructed above the pistons 44 and 48 within the piston/cylinder unit 46. When this pressure pipe 56 is acted upon by pressure, the shut-off valve 18 opens, which is formed by the valve seats 24 and 26 and the valve bodies 34 and 36.

Sealing devices 32, 56 and 58, respectively, are used for sealing off the passage of the hollow valve stem 31b through the housing 28, the inner valve stem 31a with respect to the hollow valve stem 31b, and sealing off the valve stem 31a with respect to the separating wall 50.

In contrast to the embodiments according to FIGS. 3 and 4, in the case of the shut-off valve according to FIG. 5, the valve seats may be rigidly connected with the housing 28.

Whereas, in the embodiment of the shut-off valve according to FIGS. 3 and 4, tolerance compensation is achieved by the displaceability of at least one of the valve seats with respect to the housing and, in the embodiment according to FIG. 5, a tolerance and wear compensation takes place by the separate operation of the valve bodies 34 and 36, a tolerance and wear compensation respectively can also take place in that, although the valve bodies 34 and 36 are operated jointly, one of the valve bodies is held on the other valve body in a displaceable and elastically prestressed manner as well as with a sealing effect, so that a tolerance and wear compensation respectively can take place by way of the relative mobility of the valve bodies with respect to one another.

The embodiments described above as examples can be mutually combined and modified in different manners, in which case it is important that the sealing-off of parts which are movable relative to one another takes place such that, when the valve bodies rest sealingly on the valve seats, the diagnostic space 38 is not accessible from the interior of the bypass pipe 16 but only through the diagnostic pipe 40 leading to the outside.

TABLE OF REFERENCE NUMBERS

10 Exhaust pipe
12 pre-catalyst
14 main catalyst
16 bypass pipe
18 shut-off valve
20 exhaust gas turbine
22 housing
24 first valve seat
26 second valve seat
28 ring part
30 spring
31 valve stem
32 sealing device
34 valve body
36 valve body
38 diagnostic space
40 diagnostic pipe
42 ring groove
44 piston
46 piston/cylinder unit
48 piston
50 separating wall
52 pressure spring
54 pressure spring
56 sealing device
58 sealing device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust line for an internal-combustion engine, comprising:
    a catalyst contained in the exhaust line;
    a bypass pipe operatively configured to bypass a portion of the catalyst; and
    a shut-off valve arranged in the bypass pipe and including two valve seats spaced in a flow direction of exhaust gas in the bypass pipe, at least one of the two valve seats being disposed on an inner wall of the bypass pipe, the shut-off valve operating to shut-off the bypass pipe;
    wherein the flow direction is a same direction as an opening direction of the shut-off valve;
    wherein a first valve seat of the two valve seats is disposed on the inner wall of the bypass pipe and a second valve seat of the two valve seats is disposed upstream of the first valve seat;
    wherein the second valve seat is constructed on a ring part, which is axially movably guided on a housing, the ring part being sealed with respect to the housing via a corrugated bellows spring, the corrugated bellows spring being disposed outside of the bypass pipe in a recess of the housing;
    wherein an inner portion of the shut-off valve is accessible only in a diagnostic space between the two valve seats via a single diagnostic pipe disposed in a housing of the shut-off valve; and
    wherein a tightness of the shut-off valve is determinable via the single diagnostic pipe.

2. The exhaust line according to claim 1, wherein the shut-off valve comprises:
    a valve member assembly operable for shutting and opening the shut-off valve, the valve member assembly including two valve bodies which, when the shut-off valve is shut, each rests against one of the two valve seats, respectively.

3. The exhaust line according to claim 1, wherein the second valve seat is disposed on the inner wall of the bypass pipe.

4. The exhaust line according to claim 1, wherein the exhaust gas is taken from the diagnostic space via the single diagnostic pipe, and the tightness of the shut-off valve is determined based upon an analysis of components of the exhaust gas taken from the diagnostic space.

5. The exhaust line according to claim 1, wherein the catalyst comprises a pre-catalyst and a main catalyst; and
    wherein the bypass pipe containing the shut-off valve bypasses the pre-catalyst.

6. The exhaust line according to claim 5, wherein the shut-off valve comprises:
    a valve member assembly operable for shutting and opening the shut-off valve, the valve member assembly including two valve bodies which, when the shut-off valve is shut, each rests against one of the two valve seats, respectively.

7. The exhaust line according to claim 5, further comprising:
    an exhaust gas turbine of an exhaust gas turbocharger, the exhaust gas turbine being arranged upstream of the pre-catalyst; and
    wherein the bypass pipe bypasses the exhaust gas turbine and the pre-catalyst.

8. The exhaust line according to claim 7, wherein the shut-off valve comprises:
    a valve member assembly operable for shutting and opening the shut-off valve, the valve member assembly including two valve bodies which, when the shut-off valve is shut, each rests against one of the two valve seats, respectively.

9. A shut-off valve for use in an exhaust line of an internal-combustion engine, the shut-off valve comprising:
    two valve seats spaced in a flow direction of exhaust gas in a bypass pipe, at least one of the two valve seats being disposed on an inner wall of a bypass pipe;
    a valve member assembly operable for shutting and opening the shut-off valve, the valve member assembly including two valve bodies which, when the shut-off valve is shut, each rests against one of the two valve seats, respectively; and a diagnostic space operatively configured between the two valve seats, the diagnostic space being accessible only via a single diagnostic pipe disposed in a housing of the shut-off valve when the shut-off valve is closed and the valve bodies rest sealingly against their respective valve seats;

wherein the flow direction is a same direction as an opening direction of the shut-off valve;

wherein at least one of the two valve seats is constructed on a ring part, which is axially movably guided on a housing, the ring part being sealed with respect to the housing via a corrugated bellows spring;

wherein the corrugated bellows spring is disposed outside of the bypass pipe in a recess of the housing;

wherein an inner portion of the shut-off valve is accessible only in the diagnostic space; and wherein a tightness of the shut-off valve is determinable via the single diagnostic pipe.

10. The shut-off valve according to claim 9, wherein the exhaust gas is taken from the diagnostic space via the single diagnostic pipe, and the tightness of the shut-off valve is determined based upon an analysis of components of the exhaust gas taken from the diagnostic space.

11. The shut-off valve according to claim 9, wherein a first valve seat of the two valve seats is disposed on the inner wall of the bypass pipe and a second valve seat of the two valve seats is disposed upstream of the first valve seat.

12. The shut-off valve according to claim 11, wherein the second valve seat is disposed on the inner wall of the bypass pipe.

* * * * *